(12) United States Patent
Li (10) Patent No.: US 8,670,643 B2
(45) Date of Patent: Mar. 11, 2014

(54) LARGE EFFECTIVE AREA OPTICAL FIBERS

(75) Inventor: Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 6 days.

(21) Appl. No.: 13/448,646

(22) Filed: Apr. 17, 2012

(65) Prior Publication Data

US 2012/0294576 A1 Nov. 22, 2012

Related U.S. Application Data (60) Provisional application No. 61/487,351, filed on May 18, 2011.

(51) Int. Cl.
*G02B 6/028* (2006.01)
*G02B 6/036* (2006.01)

(52) U.S. Cl.
USPC .......................................... 385/124; 385/127

(58) Field of Classification Search
USPC .................................................. 385/124, 127
See application file for complete search history.

(56) References Cited

U.S. PATENT DOCUMENTS

| | | | |
|---|---|---|---|
| 7,315,677 B1 * | 1/2008 | Li et al. .......................... | 385/123 |
| 7,555,187 B2 | 6/2009 | Bickham et al. | |
| 7,613,374 B2 | 11/2009 | Imamura | |
| 7,787,731 B2 | 8/2010 | Bookbinder et al. | |
| 8,467,649 B2 * | 6/2013 | Bickham et al. .............. | 385/127 |
| 2008/0166094 A1 | 7/2008 | Bookbinder et al. | |
| 2008/0273850 A1 | 11/2008 | Imamura | |
| 2010/0189399 A1 | 7/2010 | Sillard et al. | |

FOREIGN PATENT DOCUMENTS

EP 1124145 8/2001

OTHER PUBLICATIONS

Sep. 21, 2012 Partial International Search Report from counterpart application PCT/US12/037887.
PCT/US2012/037887 Search Report, mailed on Nov. 7, 2012.
Donlagic, D., "Opportunities to Enhance Multimode Fiber Links by Application of Overfilled Launch", Journal of Lightwave Technology, vol. 23, No. 11, pp. 3526-3539, Nov. 2005.
Jeunhomme, Single Mode Fiber Optics, pp. 39-44, Marcel Dekker, New York 1990.
Kubota, H. et al, "Intermodal group velocity dispersion of few-mode fiber", IEICE Electronics Express, vol. 7. No. 20, 1552-1556, Oct. 25, 2010.

* cited by examiner

*Primary Examiner* — Omar Rojas
(74) *Attorney, Agent, or Firm* — Svetlana Short (57) ABSTRACT

Large effective area optical fibers are disclosed. In one embodiment, an optical fiber includes a glass core and a glass cladding surrounding and in direct contact with the glass core. The glass core may include a radius $R_c$ from about 12 μm to about 50 μm; a graded refractive index profile with an alpha value greater than or equal to about 1.0 and less than about 10 at a wavelength of 1550 nm; and a maximum relative refractive index $\Delta_{cMAX}\%$ from about 0.2% to about 0.75% relative to the glass cladding. An effective area of the core may be greater than or equal to about 150 μm² such that the core supports the propagation and transmission of an optical signal with X modes at a wavelength of 1550 nm, wherein X is an integer greater than 1 and less than or equal to 110. The glass cladding may include a maximum relative refractive index $\Delta_{c1MAX}\%$ such that $\Delta_{cMAX}\% > \Delta_{c1MAX}\%$. The optical fiber has an RMS pulse broadening of less than or equal to about 0.15 ns/km at a wavelength of 1550 nm.

21 Claims, 4 Drawing Sheets

LARGE EFFECTIVE AREA OPTICAL FIBERS

CROSS-REFERENCE TO RELATED APPLICATION

This application claims the benefit of priority under 35 U.S.C. §119 of U.S. Provisional Application Ser. No. 61/487,351 filed on May 18, 2011 the content of which is relied upon and incorporated herein by reference in its entirety.

BACKGROUND

1. Field

The present specification generally relates to optical fibers and, more specifically, to optical fibers with large effective areas and reduced non-linearity.

2. Technical Background

Optical amplifiers and wavelength division multiplexing (WDM) techniques are typically utilized in optical telecommunications systems that provide high power transmissions over long distances. The definition of high power and long distances is meaningful only in the context of a particular telecommunications system wherein a bit rate, a bit error rate, a multiplexing scheme, and perhaps optical amplifiers are specified. In general, fiber nonlinearity is a fundamental limiting factor to such high speed, long haul, WDM telecommunications systems. For example, in some applications, single power levels of 1 mW or less propagated in an optical fiber may be sensitive to non-linear effects, including self-phase modulation, four-wave mixing, cross-phase modulation, and non-linear scattering processes. Each of these non-linear effects can cause the degradation of optical signals propagating in the WDM telecommunications systems.

Fiber nonlinearity can be reduced by increasing the effective area of the optical fiber as the power density of the optical fiber is inversely proportional to the effective area. However, an increase in the effective area of an optical fiber typically results in an increase in the induced bending losses (both micro and macro) and, as a result, the attenuation of the optical signal propagating in the optical fiber. Accordingly, the ability to reduce the non-linearity of conventional single-mode transmission optical fibers by increasing the effective area of the fiber is limited by the corresponding increase in bending losses for the fundamental mode of the optical signal propagating in the fiber.

Accordingly, a need exists for alternative designs for transmission optical fibers with reduced nonlinearity and bending losses.

SUMMARY

According to one embodiment, an optical fiber may include a glass core and a glass cladding surrounding and in direct contact with the glass core. The glass core may have a radius $R_c$ from about 12 μm to about 50 μm (for example, 16 μm>$R_c$>50 μm) and a graded refractive index profile with an alpha value greater than or equal to about 1.0 and less than about 10 at a wavelength of 1550 nm. The maximum relative refractive index $\Delta_{cMAX}\%$ of the core may be from about 0.2% to about 0.75% relative to the glass cladding. An effective area of the core may be greater than or equal to about 150 μm². The glass core may support the propagation and transmission of an optical signal with X modes at a wavelength of 1550 nm, wherein X is an integer greater than 1 and less than or equal to 110. The glass cladding may have a maximum relative refractive index $\Delta_{c1MAX}\%$ such that $\Delta_{cMAX}\%>\Delta_{c1MAX}\%$, wherein the optical fiber has an RMS pulse broadening of less than or equal to about 0.15 ns/km at a wavelength of 1550 nm.

In another embodiment, an optical fiber includes a glass core and a glass cladding surrounding and in direct contact with the glass core. The glass core may have a radius $R_c$ from about 12 μm to about 50 μm (for example, 16 μm>$R_c$>50 μm) and a graded refractive index profile with an alpha value greater than or equal to about 1.9 and less than or equal to about 2.1 at a wavelength of 1550 nm. A maximum relative refractive index $\Delta_{cMAX}\%$ of the core may be from about 0.2% to about 0.75% relative to an outer cladding layer of the glass cladding. An effective area of the core may be greater than or equal to 150 μm². The glass core may support the propagation and transmission of an optical signal with X modes at a wavelength of 1550 nm, wherein X is an integer greater than 1 and less than or equal to 110. The glass cladding includes an inner cladding layer surrounding and in direct contact with the glass core. The inner cladding layer may have a relative refractive index $\Delta_{ic}\%$ such that $\Delta_{cMAX}\%>\Delta_{ic}\%$. A low index ring may surround and directly contact the inner cladding layer. The outer cladding layer may surround and directly contact the low index ring. The low index ring has a minimum relative refractive index $\Delta_{LMIN}\%$ relative to the outer cladding layer and the outer cladding layer has a maximum relative refractive index $\Delta_{ocMAX}\%$ relative to pure silica glass such that $\Delta_{cMAX}\%>\Delta_{ocMAX}\%>\Delta_{LMIN}\%$. The optical fiber may have an RMS pulse broadening of less than or equal to about 0.15 ns/km at a wavelength of 1550 nm.

In yet another embodiment, an optical fiber includes a glass core and a glass cladding surrounding and in direct contact with the glass core. The glass core may have a radius $R_c$ from about 6 μm to about 16 μm. A maximum relative refractive index $\Delta_{cMAX}\%$ of the core may be from about 0.2% to about 0.5% relative to the glass cladding. The core may have a step refractive index profile with an alpha value greater than or equal to 10 at a wavelength of 1550 nm. An effective area of the core may be greater than or equal to about 150 μm² and the glass core may support the propagation and transmission of an optical signal with X modes at a wavelength of 1550 nm, wherein a theoretical cutoff wavelength of the optical fiber is greater than or equal to 1500 nm for an $LP_{11}$ mode of the optical signal and X is an integer greater than 1 and less than or equal to 25. The glass cladding may have a maximum relative refractive index $\Delta_{c1MAX}\%$ such that $\Delta_{cMAX}\%>\Delta_{c1MAX}\%$. The glass cladding of optical fiber of this embodiment may also include an optional low index ring.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of optical fibers for use as long haul transmission fibers, examples of which are illustrated in the accompanying drawings. Whenever possible, the same reference numerals will be used throughout the drawings to refer to the same or like parts. One embodiment of an optical fiber for use as a long haul transmission fiber is schematically depicted in cross section in FIG. 1. The optical fiber generally has a glass core surrounded by a glass cladding. The glass core generally has a radius $R_c$ from about 6 μm to about 50 μm and a maximum relative refractive index $\Delta_{cMAX}$ from about 0.2% to about 0.5% relative to the glass cladding. An effective area of the glass core is greater than or equal to about 150 μm². The glass core is generally able to support the transmission and propagation of an optical signal with X modes at a wavelength of 1550 nm, wherein X is an integer greater than 1 and less than or equal to 110. The glass cladding generally comprises a maximum relative refractive index $\Delta_{c1MAX}$ such that $\Delta_{cMAX} > \Delta_{c1MAX}$. The optical fibers and the properties of the optical fibers will be described in more detail herein with specific reference to the appended drawings.

The following terminology will be used herein to described the optical fibers:

The term "refractive index profile," as used herein, is the relationship between the refractive index or the relative refractive index and the radius of the fiber.

The term "relative refractive index," as used herein, is defined as:

$$\Delta(r)\% = 100 \times [n(r)^2 - n_{REF}^2]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by Δ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" of an optical fiber is the area of the optical fiber in which light is propagated and is defined as:

$$A_{\mathit{eff}} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is measured using the Peterman II method where $$MFD = 2w, \text{ and}$$

$$w^2 = 2 \frac{\int_0^\infty E^2 r\, dr}{\int_0^\infty \left(\frac{dE}{dr}\right)^2 r\, dr}$$

where E is the electric field distribution in the fiber and r is the radius of the fiber.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the LP11 mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cabled cutoff wavelength, or "cabled cutoff" can be approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test.

As used herein, the term "few moded fiber" refers to a fiber supporting the propagation of more modes than a single mode fiber but fewer modes than a normal multimode fiber. In particular, the term "few moded fiber" mean that the fiber supports more than one propagating mode in a fiber length longer than 22 meters as defined in the cable cutoff measurement. A few moded fiber can be obtained by designing the fiber with a high theoretical cutoff wavelength.

The bend resistance or bend performance of an optical fiber may be measured by the induced attenuation of light propagating through the fiber under prescribed test conditions. The bend performance of the optical fibers described herein was measured using a pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of Δ which is in units of "%", where r is the radius and which follows the equation, $$\Delta = \Delta_0 \left[ 1 - \left( \frac{r}{r_0} \right)^\alpha \right],$$

where $\Delta_0$ is the maximum relative refractive index, $r_0$ is the radius of the core, r is in the range $r_i \leq r \leq r_f$, Δ is as defined above, $r_i$ is the initial point of the α-profile, $r_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an α value of 2.0 at one or more points in the core, as well as profiles with minor variations and/or a centerline dip.

Chromatic dispersion or dispersion of a fiber is the sum of the material dispersion, the waveguide dispersion, and the inter-modal dispersion.

Unless otherwise specified herein, the above-referenced properties of the optical fiber were measured at 1550 nm.

Figure 1:
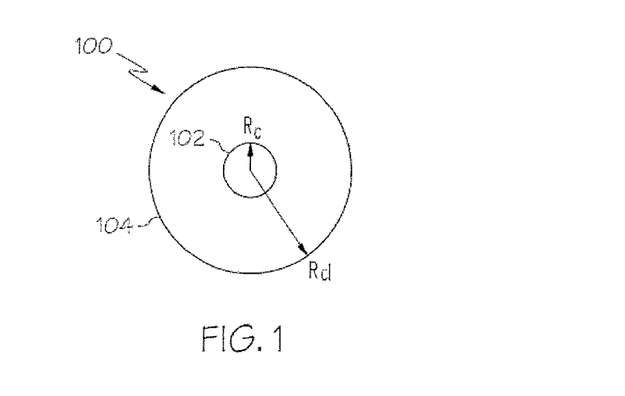
FIG. 1 schematically depicts a cross section of an optical fiber according to one or more embodiments described herein.

Referring to FIG. 1, a cross section of the glass portion of an optical fiber 100 is schematically depicted according to one or more embodiments described herein. The optical fiber 100 generally comprises a core 102 surrounded by and in direct contact with a cladding 104. In the embodiments shown and described herein, the core 102 and the cladding 104 generally comprise silica, specifically silica glass. The cross section of the optical fiber 100 may be generally circular-symmetric with respect to the center of the core 102 and the core 102 may have a radius $R_c$. In the embodiments described herein, the radius $R_c$ of the core 102 is greater than or equal to about 6 μm and less than or equal to about 50 μm. The cladding 104 surrounds the core 102 and extends from the radius $R_c$ to the radius $R_{c1}$ such that the cladding has a radial thickness $T_{c1} = R_{c1} - R_c$. In some embodiments described herein, the radius $R_{c1}$ (i.e., the radius of the glass portion of the optical fiber 100) is about 125 μm. However, it should be understood that the dimensions of the cladding 104 may be adjusted such that the radius $R_{c1}$ may be greater than 125 μm or less than 125 μm.

In the embodiments described herein, the core 102 has a maximum relative refractive index $\Delta_{cMAX}\%$ relative to the cladding 104 and the cladding 104 has a maximum relative refractive index percent $\Delta_{c1MAX}\%$ relative to pure silica glass such that $\Delta_{cMAX}\% > \Delta_{c1MAX}\%$.

In the embodiments shown and described herein, the core 102 comprises pure silica glass ($SiO_2$) or silica glass with one or more dopants which increases the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof. In the embodiments described herein, the core 102 contains a sufficient amount of dopant such that the maximum relative refractive index $\Delta_{cMAX}\%$ of the core 102 is from about 0.2% to about 0.75%, more preferably from about 0.3% to about 0.5%, even more preferably from about 0.35% to about 0.5%, and, most preferably, from about 0.4% to about 0.5%.

Figure 2A:
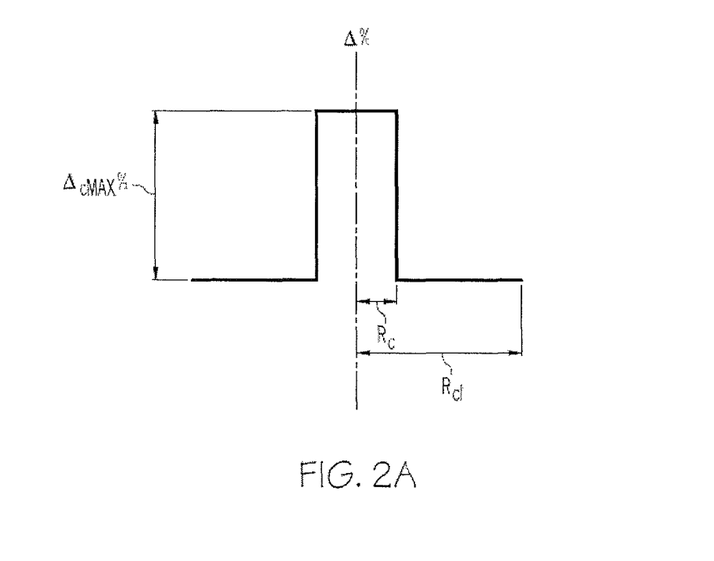
FIG. 2A schematically depicts a relative refractive index profile of the optical fiber of FIG. 1 according to one or more embodiments shown and described herein.

In the embodiments, described herein, the core 102 may have a step index profile or a graded index profile (i.e., an alpha profile). For example, in one embodiment, the core 102 has a step index profile, as is schematically depicted in FIG. 2A. In these embodiments, the radius $R_c$ of the core is from about 6 μm to about 16 μm and the alpha value of the profile is greater than or equal to 10, more preferably greater than or equal to 15, and, even more preferably, greater than or equal to 20.

Figure 2B:
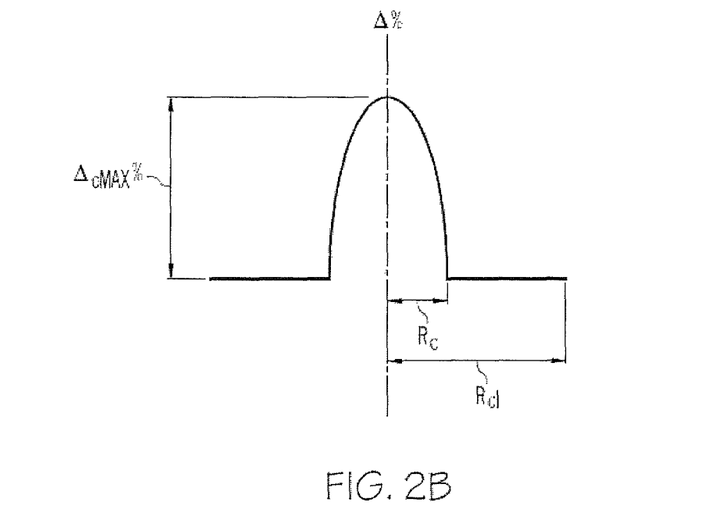
FIG. 2B schematically depicts an alternative relative refractive index profile of the optical fiber of FIG. 1 according to one or more embodiments shown and described herein.

In other embodiments, the core 102 may have a grade refractive index with an alpha profile with an alpha value greater than or equal to 1 and less than 10, preferably greater than or equal to about 1.9 and less than or equal to about 2.1, more preferably greater than or equal to about 1.97 and less than or equal to about 1.98, at a wavelength of 1500 nm, as depicted in FIG. 2B. In embodiments where the core 102 has an alpha profile, the radius $R_c$ of the core 102 is greater than or equal to about 12 μm and less than or equal to about 50 μm.

In the embodiment of the optical fiber 100 depicted in FIG. 1, the cladding 104 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding 104 is "up-doped," or silica glass with a dopant which decreases the index of refraction, such as fluorine, such as when the inner cladding is "down-doped", so long as the maximum relative refractive index $\Delta_{cMAX}\%$ of the core 102 is greater than the maximum relative refractive index $\Delta_{c1MAX}\%$ of the cladding 104. For example, in one embodiment, the cladding 104 is pure silica glass. In yet another embodiment, the inner cladding may comprise silica glass up-doped with $GeO_2$, $TiO_2$, or a similar up-dopant.

Figure 3:
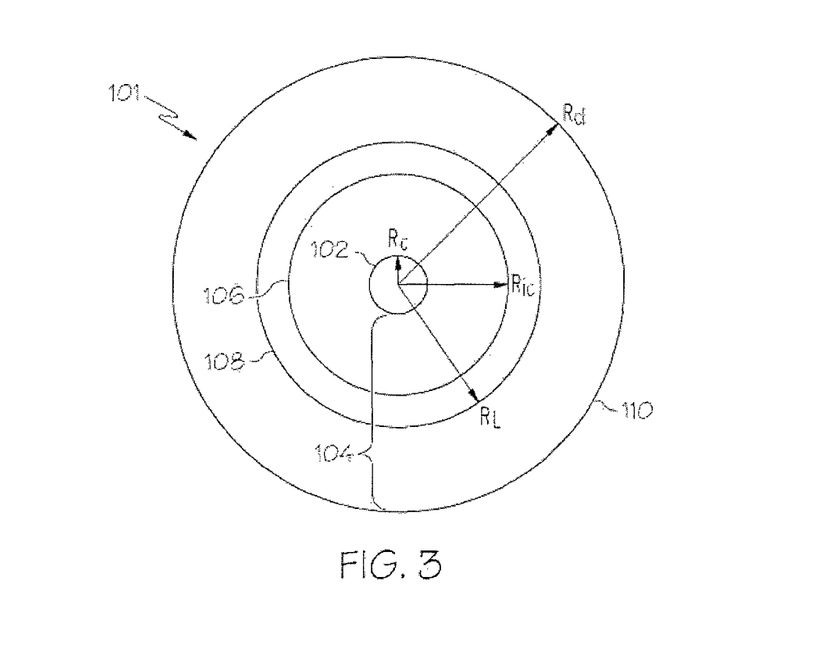
FIG. 3 schematically depicts a cross section of an optical fiber according to one or more embodiments described herein.
Figure 4A:
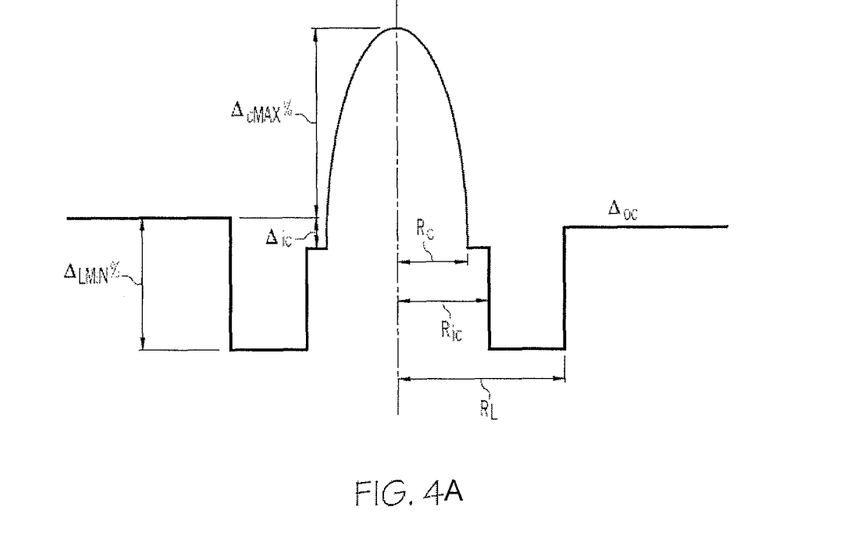
FIGS. 4A and 4B schematically depict relative refractive index profiles of optical fibers with low index rings according to one or more embodiments shown and described herein.
Figure 4B:
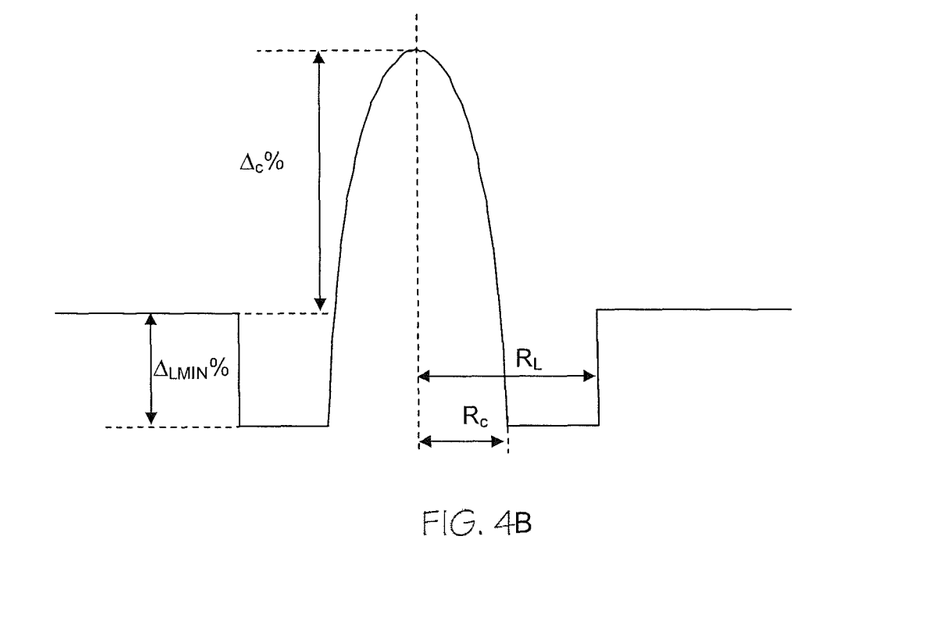

Referring now to FIGS. 3 and 4A-4B, an alternative embodiment of an optical fiber 101 is schematically depicted. The optical fiber 101 generally comprises a core 102 with either a graded or step refractive index profile and a cladding 104, as described above. However, in this embodiment, the cladding 104 comprises at least a low index ring 108 and an outer cladding layer 110. The cladding 104 may also optionally include an inner cladding layer 106, as depicted in FIG. 3. Specifically, in embodiments of the optical fiber 101 where the core 102 has a graded refractive index profile, the low index ring 108 may be spaced apart from the core 102 by the inner cladding layer 106, as is schematically illustrated in FIGS. 3 and 4A. Alternatively, the low index ring 108 may surround and directly contact the core portion, as is schematically depicted in FIG. 4B. Similarly, in embodiments of the optical fiber 101 where the core 102 has a step refractive index profile, the low index ring 108 may surround and directly contact the core 102 (i.e., the cladding does not include an inner cladding layer) or the low index ring 108 may be spaced apart from the core 102 by an inner cladding layer 106 positioned between the core 102 and the low index ring, as depicted in FIG. 3.

The inner cladding layer 106, when included, surrounds and is in direct contact with the core 102 and extends from the radius $R_c$ of the core 102 to the radius such that the inner cladding layer 106 has a radial thickness $T_{ic}=R_{ic}-R_c$ which, in the embodiments described herein, is from about 1 μm to about 5 μm.

The inner cladding 106 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the inner cladding 106 is "up-doped," or silica glass with a dopant which decreases the index of refraction, such as fluorine, such as when the inner cladding is "down-doped." In the embodiments of the optical fiber 101 described herein, the relative refractive index $\Delta_{ic}\%$ of the inner cladding 106 is less than the maximum relative refractive index $\Delta_{cMAX}\%$ of the core 102, as shown in FIG. 4. In the embodiments described herein, the relative refractive index $\Delta_{ic}\%$ of the inner cladding may be from about 0% to about 0.2%, more preferably from about 0% to about 0.1%.

The low index ring 108 is an annular region of silica-based glass which surrounds the core 102. The low index ring 108 assists in further improving the bend performance of the optical fiber 101, as will be described in more detail herein. In embodiments where the cladding 104 comprises an inner cladding layer 106, the inner cladding layer 106 is positioned between the core 102 and the low index ring 108 such that the low index ring 108 is spaced apart from the core 102 (i.e., the low index ring 108 is not in direct contact with the core 102). In embodiments where the low index ring 108 is spaced apart from the core 102 with the inner cladding layer 106 and the core has a graded refractive index with an alpha profile, the alpha value of the core may be greater than or equal to about 1 and less than about 10 at a wavelength of 1550 nm, more preferably greater than or equal to about 1.9 and less than or equal to about 2.1 at a wavelength of 1550 nm, even more preferably greater than or equal to about 1.97 and less than or equal to about 1.98 at a wavelength of 1550 nm.

However, in embodiments where the cladding 104 is formed without an inner cladding layer (i.e., $R_{ic}=0$), the low index ring 108 surrounds and is in direct contact with the core 102. In embodiments where the low index ring 108 surrounds and is in direct contact with the core 102 and the core has a graded refractive index with an alpha profile, the alpha value of the core may be less than or equal to about 2.0 at a wavelength of 1550 nm, more preferably greater than or equal to 1.97 and less than or equal to about 1.98 at a wavelength of 1550 nm.

In the embodiments described herein, the low index ring 108 extends from the radius $R_{ic}$ to the radius $R_L$ such that the low index ring has a radial thickness $T_L=R_L-R_{ic}$. However, in embodiments where $R_{ic}=0$ (i.e., the optical fiber 101 is formed without an inner cladding layer 106), the radial thickness $T_L=R_L-R_c$. In generally the radial thickness $T_L$ of the low index ring 108 is from about 2 μm to about 15 μm.

The low index ring 108 generally comprises silica glass down-doped to lower the index of refraction of the low index ring 108 with respect to pure silica glass. For example, the low index ring 108 may be down doped with fluorine, boron and/or combinations thereof in order to decrease the index of refraction of the low index ring 108 with respect to pure silica glass. In the embodiments described herein, the low index ring is formed with a sufficient amount of down-dopant such that the minimum relative refractive index percent ($\Delta_{LMIN}\%$) of the low index ring 108 is from about −0.1% to about −1.0%, more preferably from about −0.1% to about −0.7% relative to pure silica glass.

The outer cladding layer 110 surrounds and is in direct contact with the low index ring 108. The outer cladding 110 generally extends from the radius $R_L$ to the radius $R_{c1}$ such that the outer cladding layer has a radial thickness $Toc=R_{c1}-R_L$. The outer cladding layer 110 generally has a relative refractive index $\Delta_{oc}\%$ relative to pure silica glass which is greater than the relative refractive index $\Delta_{LMIN}\%$ of the low index ring 108 and less than the maximum relative refractive index $\Delta_{cMAX}\%$ of the core 102. In some embodiments, $\Delta_{oc}\% \geq \Delta_{ic}\%$; in other embodiments, $\Delta_{oc}\% \leq \Delta_{ic}\%$. Accordingly, the outer cladding 108 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the outer cladding 108 is "up-doped," or silica glass with a dopant which decreases the index of refraction, such as fluorine, such as when the outer cladding is "down-doped," so long as the relative refractive index $\Delta_{oc}\%$ of the outer cladding 108 is less than the maximum relative refractive index $\Delta_{cMAX}\%$ of the core 102 and greater than the minimum relative refractive index $\Delta_{LMIN}\%$ of the low index ring 108. In one specific embodiment, the outer cladding layer 110 is up-doped such that the relative refractive index $\Delta_{oc}\%$ of the outer cladding layer 110 is from about 0.02% to about 0.2% relative to pure silica glass.

Referring to specifically to FIG. 4A, the refractive index profile of one specific embodiment of an optical fiber is graphically depicted. In this embodiment the core of the fiber has a graded refractive index profile with a maximum relative refractive index $\Delta_{cMAX}\%$. The cladding of the optical fiber is formed with an inner cladding layer having a relative refractive index $\Delta_{ic}\%$ which is less than the maximum relative refractive index $\Delta_{cMAX}\%$ of the core. A low index ring is positioned directly adjacent to and in contact with the inner cladding layer. The low index ring has a minimum relative refractive $\Delta_{LMIN}\%$ which is less than $\Delta_{ic}\%$ and $\Delta_{cMAX}\%$. An outer cladding layer surrounds and is in direct contact with the low index ring and has a relative refractive index $\Delta_{oc}\%$ which is greater than the $\Delta_{ic}\%$ and $\Delta_{LMIN}\%$ and less than $\Delta_{cMAX}\%$. Accordingly, $\Delta_{cMAX}\%>\Delta_{oc}\%>\Delta_{ic}\%\Delta_{LMIN}\%$ in this embodiment. However, it should be understood that other embodiments are possible. For example, $\Delta_{oc}\%$ may be equal to $\Delta_{ic}\%$. Alternatively, $\Delta_{ic}\%$ may be greater than $\Delta_{oc}\%$.

In the embodiments of the optical fibers described herein, the combination of the core radius $R_c$ and the maximum relative refractive index $\Delta_{cMAX}\%$ of the core increase the theoretical cutoff wavelength of the higher order modes of an optical signal propagating in the optical fiber. Increasing the theoretical cutoff wavelength of these higher order modes has the effect of increasing the number of modes which can propagate in the core of the optical fiber and, as a result, the optical fiber becomes few-moded (i.e., the optical fiber supports the propagation and transmission of more modes than a single-mode fiber and fewer modes than a multi-moded fiber). For example, in the embodiments described herein, the theoretical cutoff wavelength of the LP11 mode of an optical signal having is greater than or equal to 1550 nm, preferably greater than 2000 nm, more preferably greater than 2500 nm. Similarly, the theoretical cutoff wavelength of the LP02 mode is greater than or equal to 1100 nm, preferably greater than 1500 nm, more preferably greater than 1800 nm. The theoretical cutoff wavelength of the LP12 mode of an optical signal having a wavelength of 1550 nm is greater than or equal to 800 nm, preferably greater than 1200 nm, more preferably greater than 1500 nm.

In the embodiments described herein, forming the optical fibers with a core radius in the range of 6 μm to 50 μm and a relative refractive index $\Delta_{cMAX}\%$ greater than or equal to about 0.2% and less than or equal to about 0.5% produces an optical fiber which supports X modes, where X is an integer. The number of scalar modes (i.e., degenerate polarization modes) supported in the core of the fiber can be determined by the equation:

$$X = \frac{\alpha}{2(\alpha+2)} n_{cMAX}^2 k^2 R_c^2 \Delta_{cMAX}$$

where $R_c$ is the radius of the core, $n_{cMAX}$ is the maximum index of refraction of the core, k is the wave number (i.e., $2\pi/\lambda$, where $\lambda$ is the wavelength of light propagated in the core), $\alpha$ is the alpha value of the core and $\Delta_{cMAX}$ is the maximum relative refractive index of the core. In the embodiments described herein, X is greater than 1 and less than or equal to 110. For example, in embodiments where the core of the optical fiber has a graded refractive index profile with an alpha value of 2, $\Delta_{cMAX}$ from 0.2 to 0.5%, and a radius from about 15 μm to 50 μm, X may be an integer from 4 to 110. However, in embodiments where the core of the optical fiber has a step refractive index profile with $\Delta_{cMAX}$ from 0.2% to 0.5%, and a radius from about 6 μm to about 16 μm, X may an integer from 2 to 25.

In addition to increasing the number of higher order modes which can propagate in the core of the optical fiber, optical fibers formed with the structure and properties described above and shown in FIGS. 1 and 3 generally have an increased effective area ($A_{eff}$) for the fundamental mode propagated through the core of the optical fiber and, as such, the optical fibers generally have reduced non-linearity. Specifically, the combination of a core with a radius from about 6 μm to about 50 μm and a relative refractive index $\Delta_{cMAX}\%$ greater than or equal to about 0.2% and less than or equal to about 0.5% produces an increase in the effective area of the optical fiber relative to conventional single mode fiber. In the embodiments described herein, the optical fibers generally have an effective area which is greater than about 150 μm$^2$, more preferably greater than about 160 μm$^2$, even more preferably greater than 170 μm$^2$. In some embodiments, the effective area of the optical fiber may be greater than about 200 μm$^2$ or even 300 μm$^2$. In still other embodiments, the effective area may even be as high as 500 μm$^2$.

However, unlike conventional single mode fibers, the increase in the effective area of the optical fiber does not result in a corresponding decrease in the bend performance of the optical fiber. Indeed, the increase in the effective area actually yields a decrease in the pin array bending losses at a wavelength of 1550 nm. In general, the optical fibers described herein have a pin array bending loss of less than about 8 dB at a wavelength of 1550 nm, preferably less than 4 dB, more preferably less than 2 dB and, most preferably, less than about 1 dB.

Preferably, the optical fibers disclosed herein have a mode field diameter at a wavelength of 1550 nm which is greater than 13 μm, preferably greater than or equal to 13 μm and less than or equal to 30 μm. In some embodiments, the mode field diameter may be greater than about 13 μm and less than about 23 μm.

The optical fibers disclosed herein also have a chromatic dispersion value greater than or equal to about 20 ps/nm/km and less than or equal to about 23 ps/nm/km at 1550 nm and a dispersion slope at a wavelength of 1550 nm of greater than or equal to about 0.0600 ps/nm$^2$/km and less than or equal to about 0.0700 ps/nm$^2$/km, preferably greater than or equal to about 0.0600 ps/nm$^2$/km and less than or equal to about 0.0670 ps/nm$^2$/km. The kappa value, defined as the ratio of the dispersion value to the dispersion slope, is preferably between about 310 nm to 350 nm at a wavelength of 1550 nm.

The optical fibers described herein have decreased non-linearity as a result of the increased effective area of the core. These fibers also exhibit improved pin array bending performance relative to standard single mode fiber. However, in the embodiments of the optical fiber which utilize a core with a step refractive index profile, the fundamental mode of the optical signal may excite higher order modes with different time delays. In addition, mode conversion between the fundamental mode and higher order modes can result in multiple-path interference (MPI) which increases noise and degrades the performance. In principle, time delays between modes and MPI may be compensated for utilizing digital signal processing. However, such compensation techniques may be improved by minimizing the time delays and MPI before digital signal processing is applied.

Figure 5:
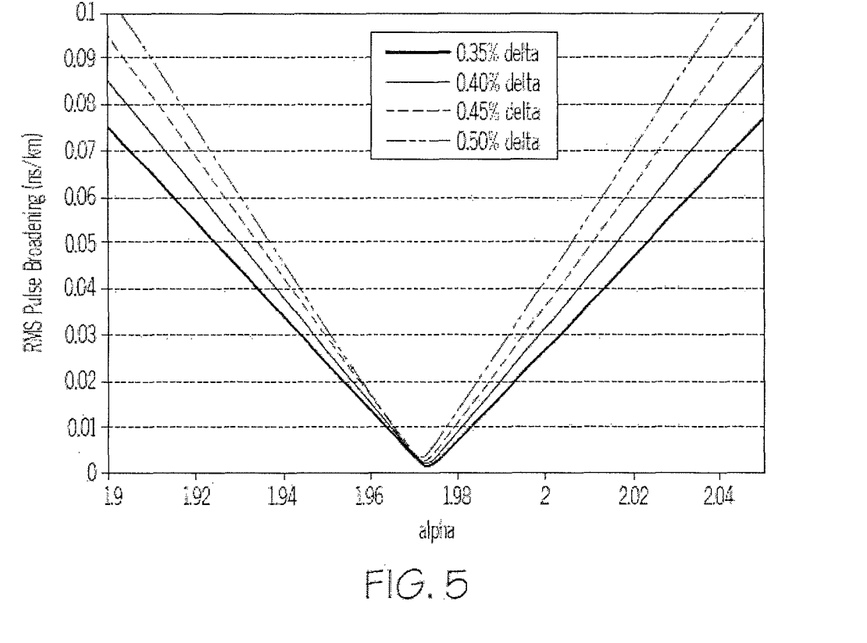
FIG. 5 graphically depicts the pulse broadening (y-axis) as a function of the alpha value (x-axis) for optical fibers with different $\Delta_{cMAX}\%$ values at a wavelength of 1550 nm.

Referring now to FIG. 5, time delays between higher order modes and MPI may be reduced by forming the optical fiber with a core having a graded refractive index profile with an alpha value less than 20, as described above. In general, lowering the alpha value from a step index profile alpha value decreases the time delays between modes propagating in the optical fiber. For example, lower the alpha value from about 20 to about 3 reduces the time delays by a factor of more than 10. Specifically, it has been determined that time delays between higher order modes can be minimized when the core of the optical fiber has a graded refractive index profile with an alpha value between 1.9 and 2.1. For example, FIG. 5 graphically depicts the RMS pulse broadening (y-axis) as a function of the alpha value (x-axis) for modeled optical fibers with maximum relative refractive indices $\Delta_{cMAX}\%$ of 0.35%, 0.40%, 0.45% and 0.50%. The RMS pulse broadening value is generally indicative of the delay between the modes of an optical signal propagated in the core. As shown in FIG. 5, the optical fibers described herein generally have an RMS pulse broadening value of less than 0.15 ns/km when the maximum relative refractive index $\Delta_{cMAX}\%$ of the core is 0.5% or less and the alpha value of the core is greater than or equal to 1.9 and less than or equal to 2.1. In one particular embodiment, the alpha value of the core is between about 1.97 and 1.98 and the RMS pulse broadening value is less than 0.01 ns/km.

Figure 6:
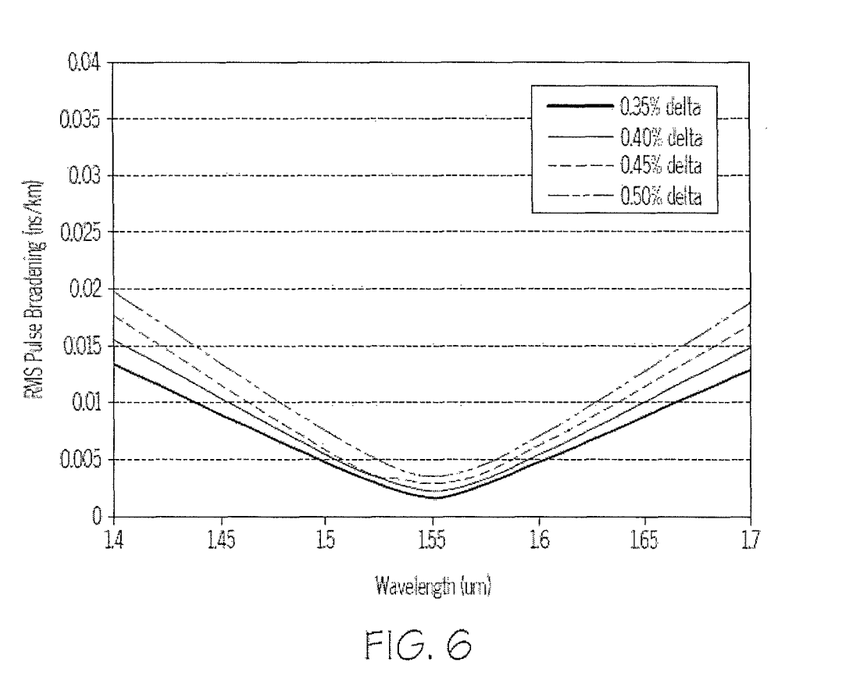
FIG. 6 graphically depicts the pulse broadening (y-axis) as a function of wavelength (x-axis) for optical fibers with different $\Delta_{cMAX}\%$ values.

Referring now to FIG. 6, the RMS pulse broadening (y-axis) as a function of wavelength (x-axis) is depicted for modeled optical fibers with maximum relative refractive indices $\Delta_{cMAX}\%$ of 0.35%, 0.40%, 0.45% and 0.50% and optimal alpha values between 1.972 and 1.974. As shown in FIG. 6, for wavelengths within the range of 1.5 µm to 1.6 µm (i.e., 1500 nm to 1600 nm), the RMS pulse broadening has a variation of less 4 ps/km. Time delays which results in optical fibers with such low variation in the RMS pulse broadening and low MPI can be readily compensated for using digital signal processing in WDM optical communication systems.

EXAMPLES

The invention will be further clarified by the following examples.

A plurality of optical fibers were mathematically modeled to determine the effect of variations of $\Delta_{cMAX}\%$ and core radius on the effective area and pin array bending losses at 1550 nm. Table 1 contains data for comparative and inventive optical fibers with step refractive index profiles. Specifically, comparative Example C1 was a single mode fiber with a core having a step refractive index profile, a $\Delta_{cMAX}\%$ valued of 0.20% and a radius of 6 µm which results in an effective area of 153.9 µm² at 1550 nm and a pin array bending loss of 65 dB at 1550 nm. Examples 2-8 were also modeled with a core having a step refractive index profile. However, in examples 2-8 the theoretical cutoff wavelength was adjusted by increasing $\Delta_{cMAX}\%$ and varying the radius of the core. As shown in Table 1, Examples 2-8 each supported the propagation and transmission of at least 2 modes and each had an effective area of greater than about 150 µm² and, in most cases, greater than 170 µm². Each of Examples 2-8 exhibited a substantial decrease in bending losses compared to Comparative Example C1. Specifically, each of Examples 2-8 exhibited a decrease in bending losses of at least 60 dB due at least in part to the increase in the effective area of the optical fiber.

TABLE 1

Modelled Optical Fibers with Step Index Cores

| | Example # | | | | | | | |
|---|---|---|---|---|---|---|---|---|
| | C1 | 2 | 3 | 4 | 5 | 6 | 7 | 8 |
| $\Delta_{cMAX}$(%) | 0.20 | 0.25 | 0.34 | 0.34 | 0.40 | 0.40 | 0.50 | 0.50 |
| $R_c$ (µm) | 6.4 | 7.2 | 8.6 | 11.9 | 9.4 | 15.0 | 10.1 | 16.8 |
| Number of modes at 1550 nm | 1 | 2 | 4 | 8 | 6 | 15 | 8 | 24 |
| LP11 cutoff (µm) | 1.505 | 1.902 | 2.641 | 3.654 | 3.146 | >5.000 | 3.767 | >5.000 |
| LP02 cutoff (µm) | 0.945 | 1.191 | 1.649 | 2.278 | 1.962 | 3.119 | 2.348 | 3.912 |
| LP12 cutoff (µm) | 0.670 | 0.839 | 1.157 | 1.595 | 1.375 | 2.183 | 1.645 | 2.738 |
| MFD @ 1550 nm (µm) | 14.0 | 13.8 | 14.3 | 17.9 | 14.8 | 21.2 | 15.1 | 22.9 |
| Aeff @ 1550 nm (µm²) | 153.9 | 156.1 | 178.2 | 296.6 | 197.7 | 430.3 | 211.4 | 514.4 |
| Dispersion @ 1550 nm (ps/nm/km) | 20.2 | 21.4 | 22.3 | 22.4 | 22.5 | 22.1 | 22.6 | 21.9 |
| Slope @ 1550 nm (ps/nm²/km) | 0.0615 | 0.0627 | 0.0645 | 0.0656 | 0.0653 | 0.0662 | 0.0661 | 0.0667 |
| kappa @ 1550 nm (nm) | 328.2 | 341.3 | 346.5 | 341.2 | 345.0 | 334.3 | 341.3 | 327.8 |
| Pin array @ 1550 nm (dB) | 6.5E+01 | 4.7E+00 | 2.0E−02 | 4.0E+00 | 2.4E−03 | 1.6E−06 | 1.5E−05 | 1.2E−08 |

Similar trends were observed for optical fibers modeled with cores having graded refractive index profiles. Specifically, Table 2 contains data for Examples 9-16 which were modeled with cores having graded refractive index profiles with alpha values of 2.0. As with the step refractive index profiles described above, the theoretical cutoff wavelength of the optical fibers with graded refractive index cores were adjusted by increasing $\Delta_{cMAX}\%$ and varying the radius of the core. As shown in Table 2, each of the modeled optical fibers supported greater than 2 modes at a wavelength of 1550 nm with Example 16 supporting 103 modes. Moreover, as with the step refractive index fibers described above, each of Examples 9-16 had an effective area of greater than 150 µm² with Examples 14 and 16 having effective areas over 500 µm². Even further, each of Examples 9-16 had a pin array bend loss of less than 7 dB and, more specifically, a pin array bend loss of more than 50 dB less than the pin array bend loss of the optical fiber of Comparative Example C1.

TABLE 2

Modelled Optical Fibers with Graded Index Cores

| | Example # | | | | | | | |
|---|---|---|---|---|---|---|---|---|
| | 9 | 10 | 11 | 12 | 13 | 14 | 15 | 16 |
| $\Delta_{cMAX}$ (%) | 0.25 | 0.25 | 0.35 | 0.35 | 0.35 | 0.35 | 0.4 | 0.5 |
| $R_c$ (μm) | 14.9 | 21.0 | 11.6 | 16.7 | 25.0 | 39.8 | 25.1 | 49.0 |
| Number of modes at 1550 nm | 5 | 9 | 4 | 8 | 18 | 47 | 21 | 103 |
| LP11 cutoff (μm) | 2.681 | 3.789 | 2.489 | 3.563 | >5.000 | >5.000 | >5.000 | >5.000 |
| LP02 cutoff (μm) | 1.844 | 2.602 | 1.713 | 2.448 | 3.665 | >5.000 | 3.931 | >5.000 |
| LP12 cutoff (μm) | 1.272 | 1.793 | 1.182 | 1.686 | 2.523 | 4.012 | 2.706 | >5.000 |
| MFD @ 1550 nm (μm) | 17.1 | 20.2 | 13.9 | 16.5 | 20.2 | 25.5 | 19.6 | 25.9 |
| Aeff @ 1550 nm (μm²) | 227.8 | 320.2 | 151.2 | 214.7 | 321.4 | 511.5 | 301.4 | 525.4 |
| Dispersion @ 1550 nm (ps/nm/km) | 21.3 | 21.4 | 21.0 | 21.2 | 21.2 | 21.2 | 21.1 | 20.9 |
| Slope @ 1550 nm (ps/nm²/km) | 0.0652 | 0.0656 | 0.0651 | 0.0658 | 0.0659 | 0.0659 | 0.0661 | 0.0664 |
| kappa @ 1550 nm (nm) | 327.3042 | 327.0935 | 322.5 | 322.7 | 322.1 | 321.8 | 319.7 | 314.4 |
| Pin array @ 1550 nm (dB) | 6.4E+00 | 9.0E−02 | 3.0E−01 | 1.6E−02 | 2.9E−04 | 2.6E−01 | 3.9E−06 | 5.7E−05 |

Table 3 contains data for Examples 17-22. The optical fibers in Examples 17-22 were modeled with a graded refractive index core with an alpha value of 2.0. The fibers in Examples 17-22 were also modeled with a low index ring spaced apart from the core with an inner cladding layer, as shown in FIG. 3 above. The maximum relative refractive index $\Delta_{cMAX}$% of the core was varied from 0.40% to about 0.75% while the radius $R_c$ of the core was varied from 12.6 μm to 36.3 μm. The relative refractive index $\Delta_{ic}$% of the inner cladding layer was varied from 0.0% to −0.1% and the radial thickness of the inner cladding layer was varied between 0.8 μm to 2.7 μm. The minimum relative refractive index $\Delta_{LMIN}$% of the low index ring was from about −0.3% to about −0.8% and the radial width of the low index ring was varied from 4.2 μm to 6.6 μm.

The optical fibers of Examples 17-22 display similar trends as the optical fibers of Table 2. Specifically, the theoretical cutoff wavelength of the optical fibers with a graded refractive index was adjusted by increasing $\Delta_{cMAX}$% and varying the radius of the core. As shown in Table 3, each of the modeled optical fibers supported greater than 2 modes at a wavelength of 1550 nm. Moreover, as with the step refractive index fibers described above, each of Examples 17-22 had an effective area of greater than 150 μm² with Examples 21 and 22 having effective areas over 200 μm². However, the addition of the low index ring spaced apart from the core by the inner cladding layer significantly reduced the pin array bend losses of the optical fibers relative to the optical fibers reported in Table 2 such that the pin array bend losses were negligible (i.e., 0). In particular, Examples 17-22 demonstrate that the pin array bending loss of the optical fiber can be reduced to 1 dB or less when the optical fiber is formed with a low index ring spaced apart from the core, particularly when the core of the optical fiber has a maximum relative refractive index $\Delta_{cMAX}$% of greater than about 0.4%.

TABLE 3

Modeled Optical Fibers with Graded Index Cores, Low Index Ring, and Inner Cladding Layer

| | Example # | | | | | |
|---|---|---|---|---|---|---|
| | 17 | 18 | 19 | 20 | 21 | 22 |
| $\Delta_{cMAX}$ (%) | 0.40 | 0.50 | 0.50 | 0.60 | 0.60 | 0.75 |
| $\Delta_{ic}$ (%) | 0.0 | 0.0 | −0.1 | −0.2 | −0.2 | −0.3 |
| $R_c$ (μm) | 12.6 | 16.8 | 16.8 | 22.4 | 27.0 | 36.3 |
| $\Delta_{LMIN}$ (%) | −0.4 | −0.3 | −0.3 | −0.5 | −0.6 | −0.8 |
| $R_{ic}$ (μm) | 13.4 | 17.9 | 17.9 | 23.8 | 29.7 | 38.0 |
| $R_L$ (μm) | 17.6 | 23.5 | 23.5 | 31.3 | 35.1 | 44.6 |
| Number of Modes @ 1550 nm | 5 | 12 | 12 | 26 | 37 | 84 |
| LP01 cutoff (μm) | 5.000 | 5.000 | 5.000 | 5.000 | 5.000 | 5.000 |
| LP11 cutoff (μm) | 2.494 | 3.811 | 3.494 | 4.790 | 5.000 | 5.000 |
| LP02 cutoff (μm) | 1.662 | 2.512 | 2.309 | 3.182 | 3.853 | 5.000 |
| LP12 cutoff (μm) | 1.256 | 1.880 | 1.729 | 2.386 | 2.884 | 4.225 |
| MFD(μm) @ 1550 nm | 13.8 | 15.1 | 14.5 | 15.5 | 17.1 | 18.4 |
| Aeff(μm²) @ 1550 nm | 151.0 | 180.3 | 164.6 | 189.3 | 228.6 | 267.5 |
| Dispersion @ 1550 nm (ps/nm/km) | 21.4 | 21.0 | 21.0 | 20.7 | 20.7 | 20.4 |
| Slope @ 1550 nm (ps/nm²/km) | 0.1 | 0.1 | 0.1 | 0.1 | 0.1 | 0.1 |
| kappa @ 1550 nm (nm) | 321.0 | 315.3 | 315.5 | 310.3 | 310.1 | 299.5 |
| Pin array @ 1550 nm (dB) | 0.0 | 0.0 | 0.0 | 0.0 | 0.0 | 0.0 |

Table 4 contains data for Examples 23-28. The optical fibers in Examples 23-28 were modeled with a graded refractive index core with an alpha value of 2. The fibers in Examples 23-28 were also modeled with a low index ring surrounding and in direct contact with the core, as shown in FIG. 7 above. The maximum relative refractive index $\Delta_{cMAX}\%$ of the core was varied from 0.20% to about 0.70% while the radius $R_c$ of the core was varied from 13.9 μm to 37.3 μm. The minimum relative refractive index $\Delta_{LMIN}\%$ of the low index ring was from about −0.1% to about −0.5% and the radial width of the low index ring was varied from 4.7 μm to 11.7 μm.

The optical fibers of Examples 23-28 display similar trends as the optical fibers of Table 3. Specifically, the theoretical cutoff wavelength of the optical fibers with a graded refractive index was adjusted by increasing $\Delta_{cMAX}\%$ and varying the radius of the core. As shown in Table 4, each of the modeled optical fibers supported greater than 2 modes at a wavelength of 1550 nm. Moreover, as with the step refractive index fibers described above, each of Examples 23-28 had an effective area of greater than 150 μm² with Example 28 having an effective area over 250 μm². However, the addition of the low index ring significantly reduced the pin array bend losses of the optical fibers. In particular, Examples 24-28 demonstrate that the pin array bending loss of the optical fiber can be reduced to less than 1 dB or less when the optical fiber is formed with a low index ring.

TABLE 4

Modelled Optical Fibers with Graded Index Core and Low Index Ring (No Inner Cladding Layer)

| | Example # | | | | | |
|---|---|---|---|---|---|---|
| | 23 | 24 | 25 | 26 | 27 | 28 |
| $\Delta_{cMAX}$ (%) | 0.2 | 0.20 | 0.30 | 0.30 | 0.60 | 0.70 |
| $R_c$ (μm) | 17.5 | 16.9 | 13.9 | 19.2 | 29.4 | 37.3 |
| $\Delta_{LMIN}$ (%) | −0.1 | −0.2 | −0.2 | −0.2 | −0.5 | −0.5 |
| $R_L$ | 29.2 | 28.2 | 18.6 | 25.6 | 35.3 | 44.7 |
| Number of modes @ 1550 nm | 5 | 4 | 4 | 9 | 44 | 84 |
| LP01 cutoff (μm) | 4.6 | 3.464 | 4.407 | 5.000 | 5.000 | 5.000 |
| LP11 cutoff (μm) | 2.1 | 1.705 | 1.892 | 2.605 | 5.000 | 5.000 |
| LP02 cutoff (μm) | 1.4 | 1.141 | 1.260 | 1.731 | 3.570 | 5.000 |
| LP12 cutoff (μm) | 1.0 | 0.861 | 0.949 | 1.300 | 2.676 | 3.788 |
| MFD @ 1550 nm (μm) | 17.6 | 16.1 | 13.8 | 16.2 | 16.4 | 18.1 |
| Aeff @ 1550 nm (μm²) | 244.3 | 204.2 | 150.1 | 206.8 | 212.3 | 257.0 |
| Dispersion @ 1550 nm (ps/nm/km) | 21.6 | 21.6 | 21.4 | 21.4 | 20.7 | 20.5 |
| Slope @ 1550 nm (ps/nm²/km) | 0.1 | 0.1 | 0.1 | 0.1 | 0.1 | 0.1 |
| kappa @ 1550 nm (nm) | 329.9 | 330.1 | 325.8 | 325.0 | 310.2 | 305.0 |
| Pin array @ 1550 nm (dB) | 1.2 | 0.4 | 0.0 | 0.4 | 0.0 | 0.0 |

It should now be understood that the optical fibers described herein have increased effective areas and reduced pin array bend losses, both of which are achieved by increasing the theoretical cutoff wavelength of higher order modes of optical signals propagating in the fiber. Accordingly, it should be understood that the optical fibers described herein support the propagation and transmission of more than one mode of an optical signal. Moreover, the increase in the effective area decreases the non-linearity of the optical fiber thereby improving the performance of the optical fiber in long-haul optical communications systems.

It should also be understood that the optical fibers described herein with cores having graded refractive index profiles may be used to minimize time delays between higher order modes of optical signals propagating in the core of the optical fiber. Moreover, forming the optical fibers with a low index ring spaced apart from the core significantly improves the pin array bend losses of the fiber thereby improving the transmission performance of the fibers. Such optical fibers are suitable for use in WDM communications systems where digital signal processing may be readily used to compensate for the minimized time delays in the optical fiber.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising a glass core and a glass cladding surrounding and in direct contact with the glass core, wherein:
   the glass core comprises:
      a radius $R_c$ wherein from about 16 μm<$R_c$<50 μm;
      a graded refractive index profile with an alpha value greater than or equal to about 1.0 and less than about 10 at a wavelength of 1550 nm;
      a maximum relative refractive index $\Delta_{cMAX}\%$ from about 0.2% to about 0.75% relative to the glass cladding;
      an effective area greater than or equal to about 150 μm², the glass core supporting the propagation and transmission of an optical signal with X modes at a wavelength of 1550 nm, wherein X is an integer greater than 1 and less than or equal to 110; and
   the glass cladding comprises a maximum relative refractive index $\Delta_{c1MAX}\%$ such that $\Delta_{cMAX}\% > \Delta_{c1MAX}\%$, wherein the optical fiber has an RMS pulse broadening of less than or equal to about 0.15 ns/km at a wavelength of 1550 nm.

2. The optical fiber of claim 1, wherein the glass cladding does not include a low index ring.

3. The optical fiber of claim 2, wherein the alpha value is greater than or equal to about 1.9 and less than or equal to about 2.1 at a wavelength of 1550 nm.

4. The optical fiber of claim 1, wherein the optical fiber has an RMS pulse broadening of less than or equal to 0.01 ns/km at a wavelength of 1550 nm.

5. The optical fiber of claim 1, wherein the effective area of the glass core is greater than or equal to about 200 µm² and wherein the optical fiber has a pin array bending loss of less than or equal to 1 dB at 1550 nm.

6. An optical fiber comprising a glass core and a glass cladding surrounding and in direct contact with the glass core, wherein:
the glass core comprises:
a radius $R_c$ from about 12 µm to about 50 µm;
a graded refractive index profile with an alpha value greater than or equal to about 1.0 and less than about 10 at a wavelength of 1550 nm;
a maximum relative refractive index $\Delta_{cMAX}\%$ from about 0.2% to about 0.75% relative to the glass cladding;
an effective area greater than or equal to about 150 µm², the glass core supporting the propagation and transmission of an optical signal with X modes at a wavelength of 1550 nm, wherein X is an integer greater than 1 and less than or equal to 110; and
the glass cladding comprises a maximum relative refractive index $\Delta_{c1MAX}\%$ such that $\Delta_{cMAX}\%>\Delta_{c1MAX}\%$, a low index ring with a relative refractive index $\Delta_{LMIN}\%$ such that $\Delta_{LMIN}<\Delta_{c1MAX}\%$, wherein the optical fiber has an RMS pulse broadening of less than or equal to about 0.15 ns/km at a wavelength of 1550 nm.

7. The optical fiber of claim 6 wherein the low index ring which surrounds and is in direct contact with the glass core and the alpha value is less than or equal to 2.0 at a wavelength of 1550 nm.

8. The optical fiber of claim 6, wherein the glass cladding comprises a low index ring which is spaced apart from the core by an inner cladding layer.

9. The optical fiber of claim 8, wherein the alpha value is greater than or equal to about 1.9 and less than or equal to about 2.1 at a wavelength of 1550 nm.

10. The optical fiber of claim 6, wherein the optical fiber has an RMS pulse broadening of less than or equal to 0.01 ns/km at a wavelength of 1550 mm.

11. The optical fiber of claim 6, wherein the optical fiber has a pin array bending loss of less than or equal to 1 dB at 1550 nm.

12. An optical fiber comprising a glass core and a glass cladding surrounding and in direct contact with the glass core, wherein:
the glass core comprises:
a radius $R_c$ from about 12 µm to about 50 µm;
a graded refractive index profile with an alpha value less than or equal to about 2.0 at a wavelength of 1550 nm;
a maximum relative refractive index $\Delta_{c1MAX}\%$ from about 0.2% to about 0.75% relative to an outer cladding layer of the glass cladding;
an effective area greater than or equal to 150 µm², the glass core supporting the propagation and transmission of an optical signal with X modes at a wavelength of 1550 nm, wherein X is an integer greater than 1 and less than or equal to 110; and
the glass cladding comprises:
an inner cladding layer surrounding and in direct contact with the glass core, the inner cladding layer having a relative refractive index $\Delta_{ic}\%$ such that $\Delta_{cMAX}\%>\Delta_{ic}\%$;
a low index ring surrounding and in direct contact with the inner cladding layer; and
the outer cladding layer surrounds and is in direct contact with the low index ring, wherein the low index ring has a minimum relative refractive index $\Delta_{LMIN}\%$ relative to the outer cladding layer and the outer cladding layer has a maximum relative refractive index $\Delta_{ocMAX}\%$ relative to pure silica glass such that $\Delta_{cMAX}\%>\Delta_{ocMAX}\%>\Delta_{LMIN}\%$, wherein the optical fiber has an RMS pulse broadening of less than or equal to about 0.15 ns/km at a wavelength of 1550 nm.

13. The optical fiber of claim 12, wherein the optical fiber has an RMS pulse broadening of less than or equal to 0.01 ns/km at a wavelength of 1550 nm.

14. The optical fiber of claim 12, wherein $\Delta_{cMAX}\%$ is greater than or equal to 0.4% and the optical fiber has a pin array bending loss of less than or equal to 1 dB.

15. The optical fiber of claim 12, wherein the low index ring has a radial thickness from about 2 µm to about 15 µm.

16. The optical fiber of claim 12, wherein the inner cladding layer has a radial thickness of less than or equal to about 5 µm.

17. An optical fiber comprising a glass core and a glass cladding surrounding and in direct contact with the glass core, wherein:
the glass core comprises:
a radius $R_c$ from about 6 µm to about 16 µm;
a maximum relative refractive index $\Delta_{cMAX}\%$ from about 0.2% to about 0.5% relative to the glass cladding;
a step refractive index profile with an alpha value greater than or equal to 10 at a wavelength of 1550 nm;
an effective area greater than or equal to about 150 µm², the glass core supporting the propagation and transmission of an optical signal with X modes at a wavelength of 1550 nm, wherein a theoretical cutoff wavelength of the optical fiber is greater than or equal to 1500 nm for an $LP_{11}$ mode of the optical signal and X is an integer greater than 1 and less than or equal to 25; and
the glass cladding comprises a maximum relative refractive index $\Delta_{c1MAX}\%$ such that $\Delta_{cMAX}\%>\Delta_{c1MAX}\%$; a low index ring surrounding the glass core; and an outer cladding layer surrounding and in direct contact with the low index ring, wherein the low index ring has a minimum relative refractive index $\Delta_{LMIN}\%$ relative to the outer cladding layer and the outer cladding layer has a maximum relative refractive index $\Delta_{ocMAX}\%$ relative to pure silica glass such that $\Delta_{c1MAX}\%>\Delta_{ocMAX}\%>\Delta_{LMIN}\%$.

18. The optical fiber of claim 17, wherein the optical fiber has a pin array bending loss of less than or equal to 8 dB.

19. The optical fiber of claim 17, wherein the glass cladding further comprises an inner cladding layer positioned between the glass core and the low index ring such that the low index ring is spaced apart from the glass core, the inner cladding layer having a radial thickness of less than or equal to about 5 µm.

20. The optical fiber of claim 17, wherein $\Delta_{ocMAX}\%$ is from about 0.02% to about 0.2% and $\Delta_{LMIN}\%$ is from about −0.1% to about −1.0.

21. The optical fiber of claim 20, wherein the low index ring has a radial thickness from about 2 µm to about 15 µm.

* * * * *